(12) United States Patent
Kim

(10) Patent No.: US 8,773,726 B2
(45) Date of Patent: Jul. 8, 2014

(54) IMAGE FORMING DEVICE CAPABLE OF CONTROLLING SCANNING UNIT AND METHOD TO CONTROL SCANNING UNIT THEREOF

(75) Inventor: Hyoung-il Kim, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1174 days.

(21) Appl. No.: 11/696,925

(22) Filed: Apr. 5, 2007

(65) Prior Publication Data

US 2008/0062476 A1 Mar. 13, 2008

(30) Foreign Application Priority Data

Sep. 8, 2006 (KR) ........................ 10-2006-0086892

(51) Int. Cl.
*H04N 1/04* (2006.01)
(52) U.S. Cl.
USPC ........... 358/412; 358/406; 358/474; 318/610; 318/696
(58) Field of Classification Search
USPC .................................. 358/421, 419; 318/696
See application file for complete search history.

(56) References Cited

U.S. PATENT DOCUMENTS

| | | | | |
|---|---|---|---|---|
| 3,896,356 A | * | 7/1975 | Hoffman et al. | 318/802 |
| 4,264,957 A | * | 4/1981 | Pautzke | 700/125 |
| 5,929,575 A | | 7/1999 | Hyodo | |
| 6,037,734 A | * | 3/2000 | Toyomura | 318/602 |
| 2003/0063325 A1 | * | 4/2003 | Takahashi | 358/420 |
| 2009/0041440 A1 | * | 2/2009 | Yoshihisa | 388/811 |

FOREIGN PATENT DOCUMENTS

| | | |
|---|---|---|
| EP | 0534690 A2 | 3/1993 |
| EP | 0540761 A1 | 5/1993 |

OTHER PUBLICATIONS

Extended European Search Report, issued Oct. 10, 2011 by the European Patent Office for European Patent Application No. 07110954.0 filed on Jun. 25, 2007.

* cited by examiner

*Primary Examiner* — Mark Zimmerman
*Assistant Examiner* — Lawrence Wills
(74) *Attorney, Agent, or Firm* — Staas & Halsey LLP

(57) ABSTRACT

An image forming device capable of controlling a scanning unit and a method to control the scanning unit, the image forming device including a rate error calculator to calculate a rate error from a difference between a practical rotation rate and a target rate of a motor that drives the scanning unit, a position error calculator to calculate a position error from a difference between a current position and a target position of the motor, and a rate/position controller to output a control pulse to control a rate and a position of the motor by applying the rate error and the position error.

33 Claims, 8 Drawing Sheets

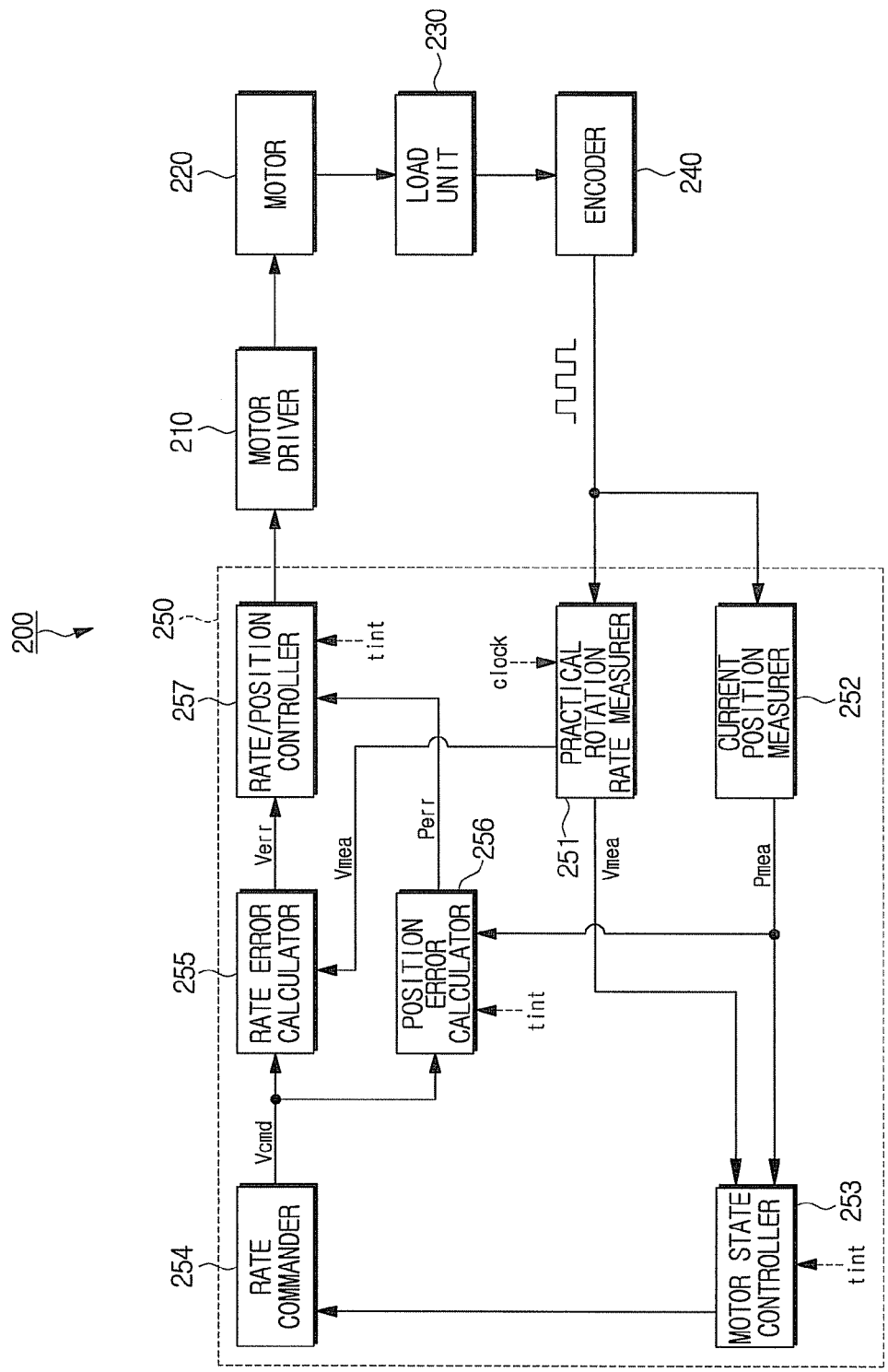

IMAGE FORMING DEVICE CAPABLE OF CONTROLLING SCANNING UNIT AND METHOD TO CONTROL SCANNING UNIT THEREOF

CROSS-REFERENCE TO RELATED APPLICATION

This application claims the benefit of Korean Patent Application No. 2006-86892, filed in the Korean Intellectual Property Office on Sep. 8, 2006, the disclosure of which is incorporated herein by reference.

BACKGROUND OF THE INVENTION

1. Field of the Invention

Aspects of the present invention relate to an image forming device capable of controlling a scanning unit and a method to control the scanning unit thereof. More particularly, aspects of the present invention relate to an image forming device capable of controlling a scanning unit so as to enhance control of positioning a motor by calculating a position error as well as a rate error of the motor which drives the scanning unit and adjusting accordingly, and a method to control the scanning unit thereof.

2. Description of the Related Art

In general, devices using a direct current (DC) motor control the rotation rate and rotation position of the DC motor with two pulses output from an encoder. In more detail, conventional image forming devices capable of controlling a scanning unit measure the practical rotation rate of the motor using a time interval between the two pulses output from the encoder. Additionally, the conventional image forming devices indirectly acquire a rotation position of the motor by counting falling edges or rising edges generated from the two pulses output from the encoder. Accordingly, the conventional image forming devices are limited in controlling the motor to be positioned at a particular position at a particular time by moving at a regular rate.

FIG. 1A is a graph showing a moving distance (i.e., a rotation position of the motor detected by a conventional image forming device), and FIG. 1B is a graph showing a position error generated by $P_{cmd}$ and $P_{mea}$ of FIG. 1A. In FIGS. 1A and 1B, $P_{cmd}$ is the target rotation position of the motor, $P_{mea}$ is the practical rotation position of the motor, $P_{err}$ is the error between $P_{cmd}$ and $P_{mea}$, and t is the time. FIGS. 1A and 1B show that there is an error between the practical rotation position and target rotation position of the motor.

If such a conventional image forming device capable of controlling a scanning unit is mounted in a scanner, a Charge-Coupled device (CCD) that is driven by a DC motor has an irregular moving distance and a scanned image is distorted.

SUMMARY OF THE INVENTION

Aspects of the present invention provide an image forming device controlling a scanning unit so as to achieve the reliability of control by adjusting a voltage necessary to drive a motor according to the rotation rate and moving distance of the motor and a method to control the scanning unit thereof.

Aspects of the present invention also provide an image forming device controlling a scanning unit so as to solve image distortion generated by driving a motor regardless of a position of a motor if the motor is mounted in a scanner and a method to control the scanning unit thereof.

According to an aspect of the present invention, there is provided an image forming device controlling a scanning unit, the image forming device comprising: a rate error calculator to calculate a rate error from a difference between a practical rotation rate and a target rotation rate of a motor that drives the scanning unit; a position error calculator to calculate a position error from a difference between a current position and a target position of the motor; and a rate/position controller to output a control pulse to control a rate and a position of the motor by applying the rate error and the position error.

The position error calculator calculates the target position using the target rotation rate and a preset position error calculation cycle.

The position error calculator calculates the position error using the following equation:

$$P_{err} = (\int V_{cmd} \times T) - P_{mea}$$

where $P_{err}$ is the position error, $V_{cmd}$ is the target rate, T is the position error calculation cycle, and $P_{mea}$ is the current position.

The rate/position controller comprises: a rate controller to calculates a rate control voltage necessary for rate control by applying a control method to the rate error; a position controller to calculate a position control voltage necessary for position control by applying a control method to the position error; an adder to add the rate control voltage and the position control voltage; and a pulse width modulator (PWM) to output the control pulse by applying a pulse width modulation method to the sum of the rate control voltage and the position control voltage.

The rate controller calculates the rate control voltage using the following equation:

Rate control voltage =
$$(V_{err} \times G_{P-V}) + \left(\left(\int V_{err}\right) \times G_{I-V}\right) + \left(\left(\frac{d}{dt} V_{err}\right) \times G_{D-V}\right)$$

where $V_{err}$ is the rate error, GP-V is a rate proportional gain preset in the rate controller, GI-V is a rate integral gain preset in the rate controller, and GD-V is a rate differential gain preset in the rate controller.

The position controller calculates the position control voltage using the following equation:

Position control voltage =
$$(P_{err} \times G_{P-P}) + \left(\left(\int P_{err}\right) \times G_{I-P}\right) + \left(\left(\frac{d}{dt} P_{err}\right) \times G_{D-P}\right)$$

where $P_{err}$ is the position error, GP-P is a position proportional gain preset in the position controller, GI-P is a position integral gain preset in the position controller, and GD-P is a position differential gain preset in the position controller.

The image forming device further comprises: an encoder to output at least two pulses which vary according to the practical rotation rate of the motor; a practical rotation rate measurer to measure the practical rotation rate using a time interval and a physical distance interval of the at least two pulses; and a current position measurer to measure the current position by counting the number of edges whenever the edge is generated from the at least two pulses.

The control method is one of a Proportional Integral Derivative (PID) control method, a Proportional Integral (PI) control method, an Integral Derivative (ID) control method, a Proportional Derivative (PD) control method, a proportional control method, an integral control method, and a rate control method.

According to another aspect of the present invention, there is provided a method of controlling a scanning unit, the method comprising: calculating a rate error from a difference between a practical rotation rate and a target rotation rate of a motor that drives the scanning unit; calculating a position error from a difference between a current position and a target position of the motor; and outputting a control pulse to control a rate and a position of the motor by applying the rate error and the position error.

The calculating of the position error comprises calculating the target position using the target rotation rate and a preset position error calculation cycle.

The calculating of the position error comprises calculating the position error using the following equation:

$$P_{err} = (V_{cmd} \times T) - P_{mea}$$

where $P_{err}$ is the position error, $V_{cmd}$ is the target rate, T is the position error calculation cycle, and $P_{mea}$ is the current position.

The outputting of the control pulse comprises: calculating a rate control voltage necessary for rate control by applying a control method to the rate error; calculating a position control voltage necessary for position control by applying the control method to the position error; adding the rate control voltage and the position control voltage; and outputting the control pulse by applying a pulse width modulation method to the sum of the rate control voltage and the position control voltage.

The calculating of the rate control voltage comprises calculating the rate control voltage using the following equation:

Rate control voltage =

$$(V_{err} \times G_{P-V}) + \left(\left(\int V_{err}\right) \times G_{I-V}\right) + \left(\left(\frac{d}{dt} V_{err}\right) \times G_{D-V}\right)$$

where $V_{err}$ is the rate error, GP-V is a rate proportional gain preset in the rate controller, GI-V is a rate integral gain preset in the rate controller, and GD-V is a rate differential gain preset in the rate controller.

The calculating of the position control voltage comprises calculating the position control voltage using the following equation:

Position control voltage =

$$(P_{err} \times G_{P-P}) + \left(\left(\int P_{err}\right) \times G_{I-P}\right) + \left(\left(\frac{d}{dt} P_{err}\right) \times G_{D-P}\right)$$

where $P_{err}$ is the position error, GP-P is a position proportional gain preset in the position controller, GI-P is a position integral gain preset in the position controller, and GD-P is a position differential gain preset in the position controller.

The method further comprises: outputting at least two pulses which vary according to the practical rotation rate of the motor; measuring the practical rotation rate using a time interval and a physical distance interval of the at least two pulses; and measuring the current position by counting the number of edges whenever the edge is generated from the at least two pulses.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2 shows an image forming device capable of controlling a scanning unit according to an embodiment of the present invention;

DETAILED DESCRIPTION OF THE EMBODIMENTS

Figure 1A:
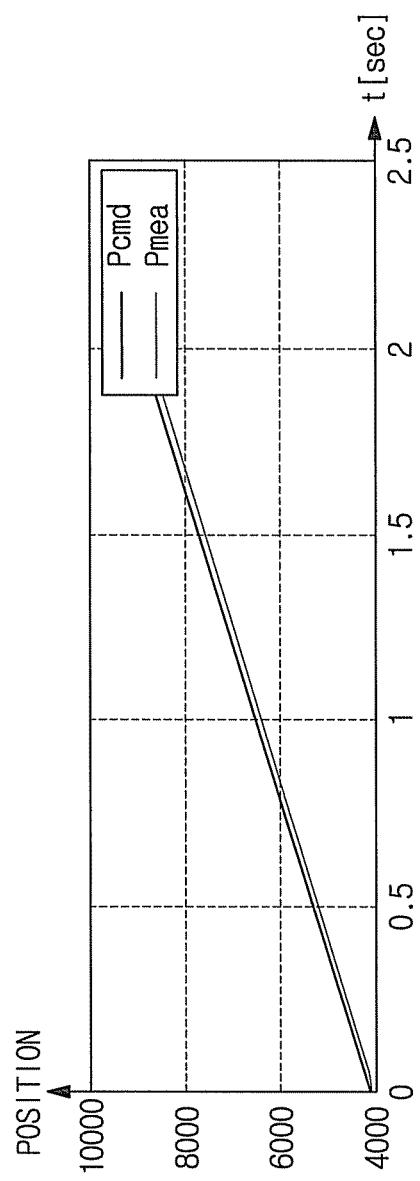
FIG. 1A is a graph showing a moving distance (i.e., a rotation position of a motor) detected by a conventional image forming device capable of controlling a scanning unit.
Figure 1B:
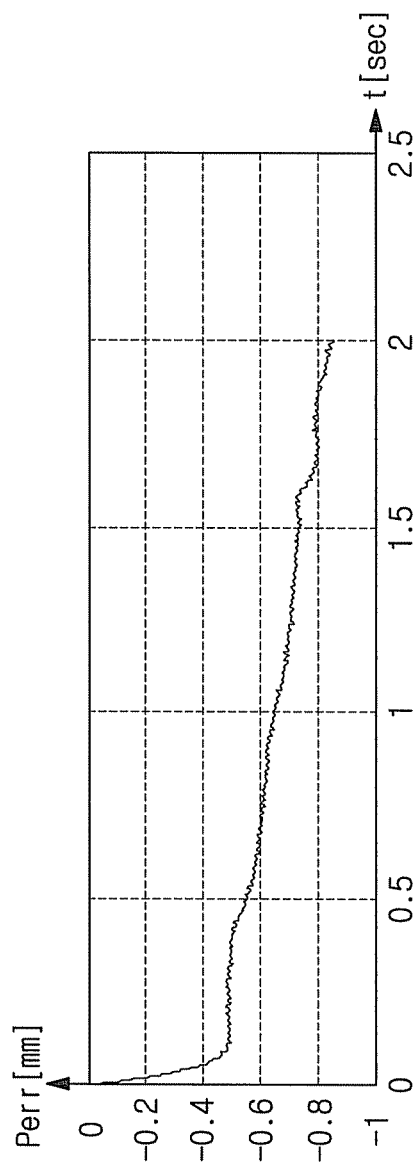
FIG. 1B is a graph showing a position error generated by $P_{cmd}$ and $P_{mea}$ of FIG. 1A.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 2 shows an image forming device 200 capable of controlling a scanning unit according to an embodiment of the present invention. Referring to FIG. 2, the image forming device 200 includes a motor driver 210, a motor 220, a load unit 230, an encoder 240, and an Application-Specific Integrated Circuit (ASIC) 250. Description or explanation of elements related to forming images is omitted to focus on aspects of the present invention.

The image forming device 200, according to an aspect of the present invention, may be applicable to all devices that use a DC servo motor and increases control performance of a rotation rate and rotation position of the motor using certain control methods. That is, the image forming device 200 is not limited to use with a scanning unit. The control methods include, although not limited to, a Proportional Integral Derivative (PID) control method, a Proportional Integral (Pi) control method, an Integral Derivative (ID) control method, a Proportional Derivative (PD) control method, a proportional control method, an integral control method and a rate control method. Hereinbelow, a PID control method is described as an example.

The motor driver 210 applies a practical voltage necessary to drive the motor 220 to the motor 220 by a pulse output from the ASIC 250. The motor 220 is a DC servo motor and drives a device mounting the image forming device 200 by rotation.

For example, if the image forming device 200 is mounted in a scanner, the motor 220 drives a sensor such as a CCD. The load unit 230 outputs a load value put when driving the motor 220.

The encoder 240 may be mounted at a rotation axis of the motor 220 or the load unit 230. According to an aspect of the present invention, the encoder 240 is mounted at the load unit 230. The encoder 240 penetrates a light beam incident from a light source (not shown) through a film of a script form or a rotation flat of a wheel form, and outputs two pulses corresponding to channels A and B, having a phase difference of 90°. The two pulses have the same cycle and the waveform of each pulse varies according to a rotation rate of the motor 220.

The ASIC 250 is a chip to calculate an optimal driving voltage considering a rate and moving distance of the motor 220 using the two pulses output from the encoder 240 and a system clock provided from an external clock generator (not shown), and includes a memory (not shown) to store a program necessary to perform the above function. To this end, the ASIC 250 includes a practical rotation rate measurer 251, a current position measurer 252, a motor state controller 253, a rate commander 254, a rate error calculator 255, a position error calculator 256, and a rate/position controller 257.

The practical rotation rate measurer 251 measures a practical rotation rate of the motor 220 using a time interval and distance interval of the two pulses output from the encoder 240.

The current position measurer 252 measures the current position $P_{mea}$ of the motor 220 (i.e., a current moving distance of the motor 220) by counting the number of edges whenever the edge is generated from the two pulses output from the encoder 240.

Figure 3:
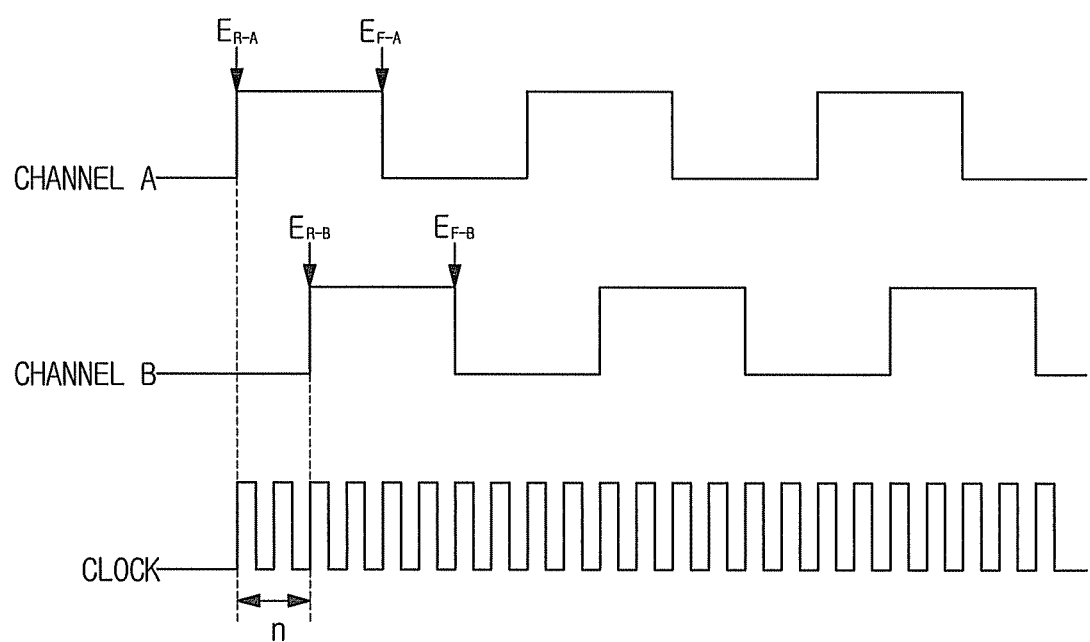
FIG. 3 shows waveforms to describe a method to measure a practical rotation rate and a current position of a motor of FIG. 2.

FIG. 3 shows waveforms to describe a method to measure a practical rotation rate and a current position of the motor 220 of FIG. 2. Referring to FIG. 3, the encoder 240 outputs two pulses corresponding to channels A and B having the same cycle and a phase difference of 90°. The practical rotation rate measurer 251 measures a time interval between the two pulses by counting the number of clocks (n) in an area where an edge is generated whenever a rising edge $E_{R-A}$ or $E_{R-B}$ or a falling edge $E_{F-A}$ or $E_{F-B}$ is generated in the pulses of channels A and B.

The practical rotation rate measurer 251 measures a practical rotation rate $V_{mea}$ using the measured time interval and a physically preset distance interval between the pulses. Then, the practical rotation rate $V_{mea}$ of the motor 220 is automatically updated to a rate register (not shown) by counting the number of clocks whenever a rising edge or a falling edge is generated.

The current position measurer 252 determines that the motor 220 is rotated from a previous edge to a current edge whenever a rising edge or a falling edge is generated, and automatically updates the current position $P_{mea}$ of the motor 220 (i.e., a moving distance of the motor 220) in a position register (not shown). The pulse varies according to the practical rotation rate $V_{mea}$ of the motor 220, and thus the moving distance also varies according to the practical rotation rate $V_{mea}$.

Referring to FIG. 2 again, the motor state controller 253 determines the state of the motor 220 using the measured practical rotation rate $V_{mea}$, the measured current position $P_{mea}$, and a time interrupt $t_{int}$ generated in a central processing unit (CPU) (not shown). The state of the motor 220 is divided into an acceleration section, a uniform section, and a deceleration section, and the time interrupt $t_{int}$ occurs every control cycle. The motor state controller 253 operates the rate commander 254 at time intervals when the time interrupt $t_{int}$ is generated, so as to output a target rotation rate $V_{cmd}$ optimal to the determined state of the motor 220.

For example, the motor state controller 253 operates the rate commander 254 to stop acceleration and maintain a uniform state if the measured practical rotation rate $V_{mea}$ is equal to or greater than a particular rate, or operates the rate commander 254 to enter a deceleration state if the measured current position $P_{mea}$ is equal to or greater than a particular position.

The rate commander 254 outputs the target rotation rate $V_{cmd}$ optimal to the state of the motor 220 by control of the motor state controller 253.

The rate error calculator 255 calculates a rate error $V_{err}$, which is a difference between the target rotation rate $V_{cmd}$ required by the rate commander 254 and the practical rotation rate $V_{mea}$ output by the practical rotation rate measurer 251. That is, the rate error calculator 255 calculates the rate error $V_{err}$ using the following equation:

$$V_{err} = V_{cmd} - V_{mea} \quad \text{[Equation 1]}$$

where $V_{err}$ is the rate error, $V_{cmd}$ is the target rotation rate, and $V_{mea}$ is the practical rotation rate.

The position error calculator 256 calculates a position error $P_{err}$, which is a difference between a target position, where the motor 220 is required to be placed according to a driving time, and the current position $P_{mea}$ of the motor 220 output from the current position measurer 252. That is, the position error calculator 256 calculates the position error $P_{err}$ using the following equation:

$$P_{err} = (\int V_{cmd} \times T) - P_{mea} \quad \text{[Equation 2]}$$

where $P_{err}$ is the position error, $V_{cmd}$ is the target rotation rate, T is a cycle to calculate the position error, and $P_{mea}$ is the current position.

The position error calculator 256 calculates the target position using the required target rate $V_{cmd}$ and the time interval of the time interrupt $t_{int}$ generated from the CPU (not shown), and then calculates the position error $P_{err}$ by subtracting the measured current position $P_{mea}$ from the target position. The time interval indicates a preset cycle to calculate a position error, and $(\int V_{cmd} \times T)$ indicates accumulation of a moving distance by a time unit.

The rate/position controller 257 outputs a control pulse necessary to control a rate and position of the motor 220 by applying a, for example, PID control method to the calculated rate error $V_{err}$ and position error $P_{err}$.

Figure 4:
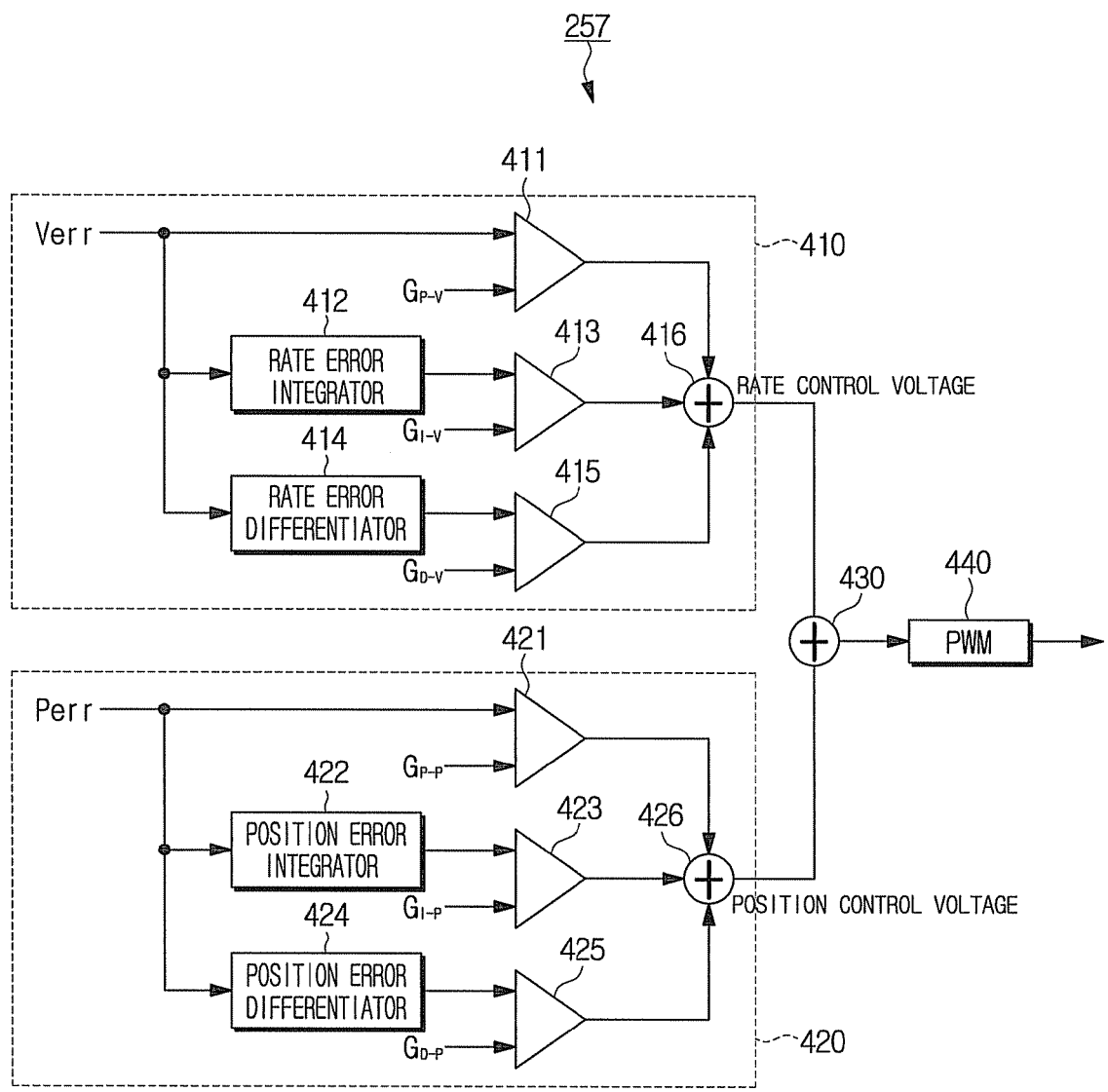
FIG. 4 is a block diagram showing a rate/position controller of FIG. 2 in more detail.

FIG. 4 is a block diagram showing the rate/position controller of FIG. 2 in more detail. Referring to FIG. 4, the rate/position controller 257 includes a rate controller 410, a position controller 420, an adder 430, and a pulse width modulator (PWM).

The rate controller 410 outputs a rate control voltage necessary for rate control by applying a, for example, PID control method to the rate error $V_{err}$ calculated by the rate error calculator 255. To this end, the rate controller 410 includes a first amplifier 411, a rate error integrator 412, a second amplifier 413, a rate error differentiator 414, a third amplifier 415, and a first adder 416, and calculates the rate control voltage using the following equation:

$$\text{Rate control voltage} = \quad \text{[Equation 3]}$$
$$(V_{err} \times G_{P-V}) + \left(\left(\int V_{err}\right) \times G_{I-V}\right) + \left(\left(\frac{d}{dt} V_{err}\right) \times G_{D-V}\right)$$

where $V_{err}$ is the rate error, $G_{P\text{-}V}$ is the preset rate proportional gain, $G_{I\text{-}V}$ is the preset rate integral gain, and $G_{D\text{-}V}$ is the preset rate differential gain.

The rate proportional gain, rate integral gain, and rate differential gain are values preset in a memory (not shown) of the rate controller 410 or a separate memory (not shown).

The first amplifier 411 amplifies the rate error $V_{err}$ using the rate proportional gain. The rate error integrator 412 integrates the rate error $V_{err}$ to calculate the accumulated amount of the rate error $V_{err}$. The second amplifier 413 amplifies the calculated accumulated amount of the rate error $V_{err}$, using the rate integral gain. The rate error differentiator 414 differentiates the rate error $V_{err}$ to calculate a changed amount of the rate error $V_{err}$. The third amplifier 415 amplifies the changed amount of the rate error $V_{err}$ using the rate differential gain. The first adder 416 adds the values output from the first, second, and third amplifiers 411, 413 and 415, and outputs the rate control voltage necessary for rate control.

The position controller 420 outputs a position control voltage necessary for position control by applying a, for example, PID control to the position error $P_{err}$ calculated by the position error calculator 256. To this end, the position controller 420 includes a fourth amplifier 421, a position error integrator 422, a fifth amplifier 423, a position error differentiator 424, a sixth amplifier 425, and a second adder 426, and calculates the position control voltage using the following equation:

$$\text{Position control voltage} = (P_{err} \times G_{P\text{-}P}) + \left(\left(\int P_{err}\right) \times G_{I\text{-}P}\right) + \left(\left(\frac{d}{dt} P_{err}\right) \times G_{D\text{-}P}\right) \quad \text{[Equation 4]}$$

where $P_{err}$ is the position error, $G_{P\text{-}P}$ is the preset position proportional gain, $G_{I\text{-}P}$ is the preset position integral gain, and $G_{D\text{-}P}$ is the preset position differential gain.

The position proportional gain, position integral gain and position differential gain are values preset in a memory (not shown) of the position controller 420 or a separate memory (not shown).

The fourth amplifier 421 amplifies the position error $P_{err}$ using the position proportional gain. The position error integrator 422 integrates the position error $P_{err}$ to calculate the accumulated amount of the position error $P_{err}$. The fifth amplifier 423 amplifies the calculated accumulated amount of the position error $P_{err}$ using the position integral gain. The position error differentiator 424 differentiates the position error $P_{err}$ to calculate a changed amount of the position error $P_{err}$. The sixth amplifier 425 amplifies the changed amount of the position error $P_{err}$ using the position differential gain. The second adder 426 adds the values output from the fourth, fifth, and sixth amplifiers 421, 423 and 425, and outputs the position control voltage necessary for position control.

The adder 430 adds the rate control voltage output from the first adder 416 and the position control voltage output from the second adder 426 so as to output a final control voltage. The final control voltage is applied to the motor 220.

The PWM 440 outputs a control pulse necessary to control a rate and a position of the motor 220 by applying a PWM method to the final control voltage output from the adder 430. That is, the PWM 440 outputs the control pulse proportional to the final control voltage and provides the control pulse to the motor driver 210.

The motor driver 210 applies a practical voltage to the motor 220 according to the control pulse to generate torque. The motor 220 is rotated by the motor driver 210. Ultimately, the position error $P_{err}$ calculated by the position error calculator 256 is minimized.

Figure 5A:
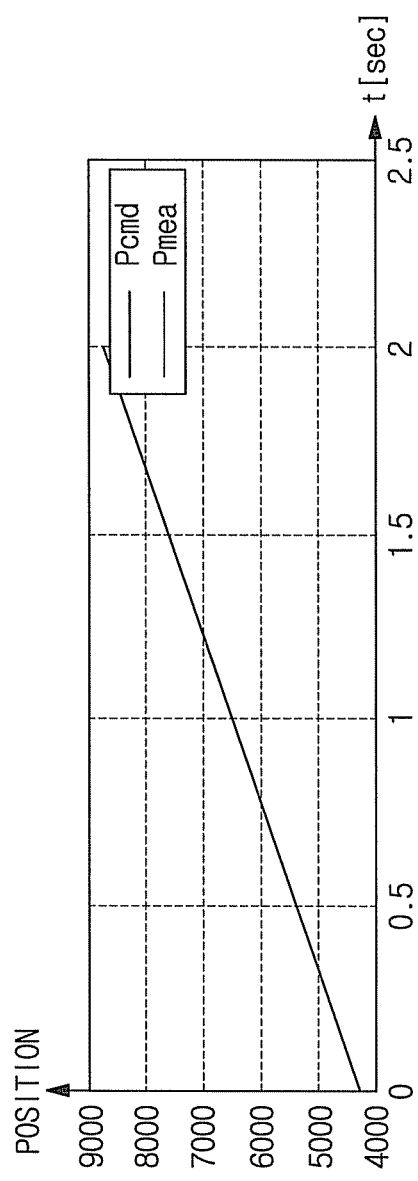
FIG. 5A is a graph showing a moving distance, that is, a rotation position of the motor detected by the image forming device of FIG. 2.
Figure 5B:
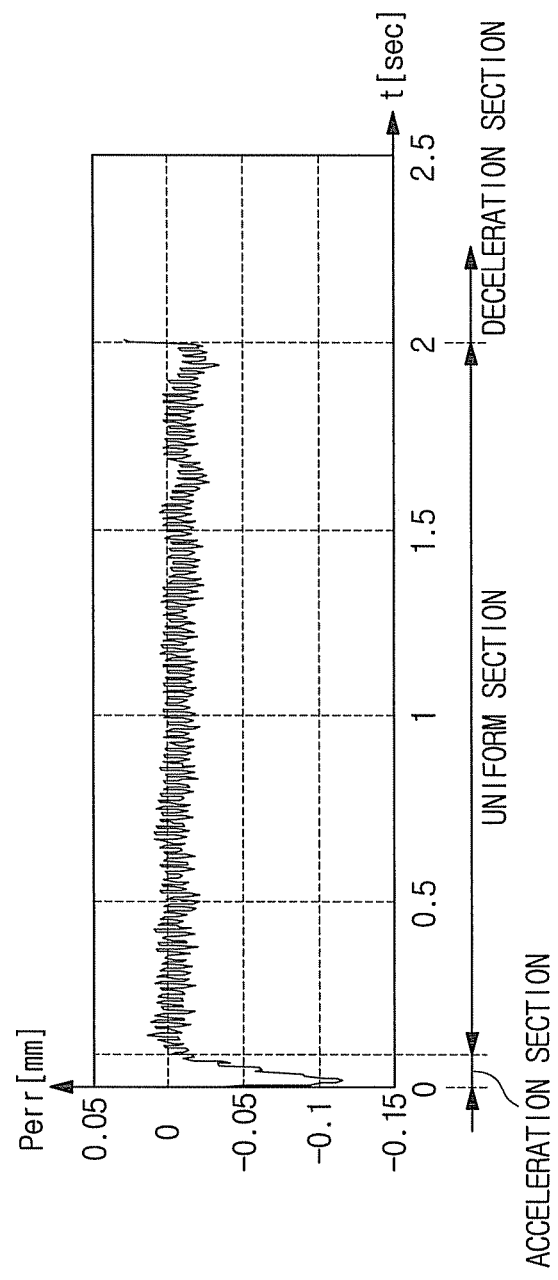
FIG. 5B is a graph showing a position error generated by $P_{cmd}$ and $P_{mea}$ of FIG. 5A.

FIG. 5A is a graph showing a moving distance, that is, a rotation position of the motor detected by FIG. 2, and FIG. 5B is a graph showing a position error generated by $P_{cmd}$ and $P_{mea}$ of FIG. 5A.

Referring to FIGS. 5A and 5B, $P_{cmd}$ is the target position of the motor 220, $P_{mea}$ is the current position of the motor 220, $P_{err}$ is the error between $P_{cmd}$ and $P_{mea}$, and t is the time. FIGS. 5A and 5B show a minimized difference between $P_{cmd}$ and $P_{mea}$.

Figure 6:
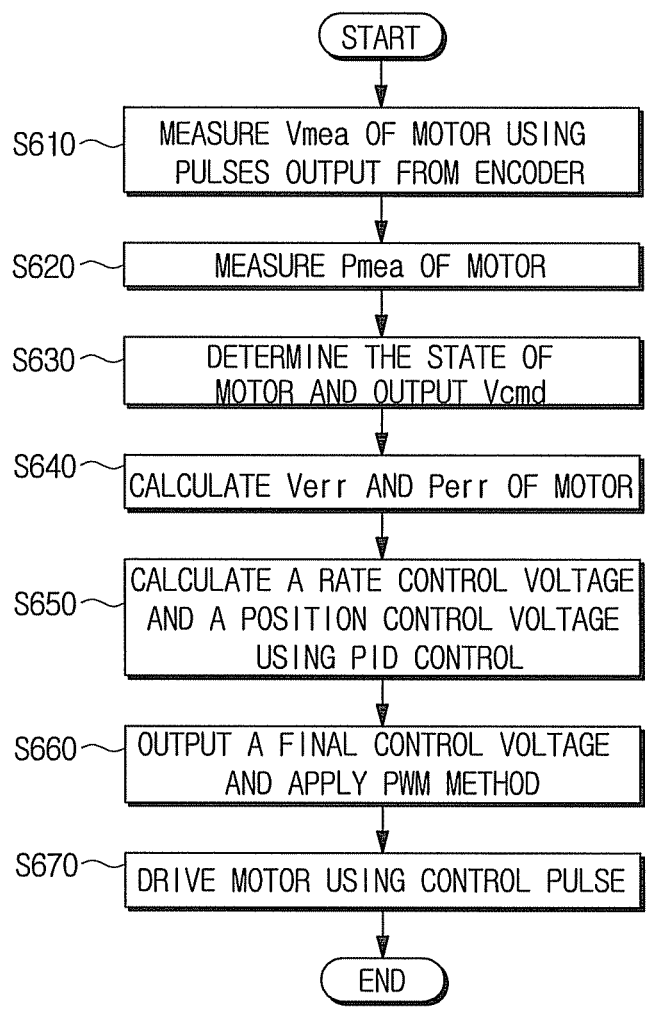
FIG. 6 is a flow chart showing a method to control a scanning unit according to an embodiment of the present invention.

FIG. 6 is a flow chart showing a method to control a rate and position of a motor according to an embodiment of the present invention.

Referring to FIGS. 2-6, in operation 610, the practical rotation rate measurer 251 measures a practical rotation rate $V_{mea}$ of the motor 220 using a time interval and a distance interval of two pulses output from the encoder 240 as in FIG. 3.

In operation 620, the current position measurer 252 measures the current position $P_{mea}$ of the motor 220 (i.e., the moving distance of the motor 220) by counting the number of edges whenever the edge is generated from the two pulses output from the encoder 240 as in FIG. 3.

The motor state controller 253 determines the state of the motor 220 using the practical rotation rate $V_{mea}$, the current position $P_{mea}$, and a time interrupt $t_{int}$ generated in the CPU (not shown), and operates the rate commander 254 to output a target rotation rate $V_{cmd}$ optimal to the determined state of the motor 220, in operation 630.

Subsequently, the rate error calculator 255 calculates a rate error $V_{err}$ using Equation 1 and the position error calculator 256 calculates a position error $P_{err}$ using Equation 2, in operation 640.

In operation 650, the rate/position controller 257 calculates a rate control voltage necessary for rate control by applying a, for example, PID control method to the rate error $V_{err}$ using Equation 3, and calculates a position control voltage necessary for position control by applying a, for example, PID control method to the position error $P_{err}$ using Equation 4.

The adder 430 outputs a final control voltage by adding the rate control voltage and the position control voltage, and the PWM 440 outputs a control pulse necessary to control a rate and a position of the motor 220 by applying a PWM method to the final control voltage, in operation 660.

The motor driver 210 drives the motor 220 using the control pulse in operation 670. Accordingly, the motor 220 is rotated by the motor driver 210 and the position error $P_{err}$, calculated by the position error calculator 256 is minimized. That is, if the image forming device 200 described above according to an embodiment of the present invention is mounted in devices having a scanning function such as a scanner or a multi-function device, the image forming device 200 may control a sensor such as a CCD to be rotated to a specified position at a specified rate.

As can be appreciated from the above description of an image forming device capable of controlling a scanning unit according to an embodiment of the present invention and a method to control the scanning unit thereof, rate control performance and position control performance is enhanced by adjusting a voltage necessary to drive a motor according to the rate and moving distance of the motor, and accordingly the reliability of controlling a motor increases.

In particular, if scanning is performed by the image forming apparatus according to an embodiment of the present invention, a sensor such as a CCD is controlled to be rotated to a specified position at a specified rate, so that distortion (such as a difference in a size of an image) can be resolved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image forming device controlling a motor that drives a unit, the device comprising:
   a rate error calculator to calculate a rate error from a difference between a practical rotation rate and a target rotation rate of the motor;
   a position error calculator to calculate a position error from a required target rate and a time interval of a time interrupt that is generated by a central processing unit (CPU) every control cycle;
   a motor state controller to determine a state of the motor using the practical rotation rate, the current position, and the time interrupt;
   a rate commander to output the target rotation rate that is optimal for the determined state of the motor to the rate error calculator;
   a rate/position controller to output a control pulse to control a rotation rate and a position of the motor by applying the rate error received from the rate error calculator and the position error received from the position error calculator;
   an encoder to output at least two pulses that vary according to the practical rotation rate of the motor;
   a practical rotation rate measurer to measure the practical rotation rate using a time interval and a physical distance interval of the at least two pulses; and
   a current position measurer to measure the current position by counting a number of edges whenever each of the edges is generated from the at least two pulses,
   wherein the motor state controller operates the rate commander at time intervals when the time interrupt is generated, so as to output a target rotation rate optimal to the determined state of the motor.

2. The image forming device as claimed in claim 1, wherein the position error calculator calculates a target position using a target rotation rate and a preset position error calculation cycle.

3. The image forming device as claimed in claim 1, wherein the position error calculator calculates the position error using the following equation:

$$P_{err} = (\int V_{cmd} \times T) - P_{mea}$$

where $P_{err}$ is the position error, $V_{cmd}$ is the target rotation rate, T is a position error calculation cycle, and $P_{mea}$ is the current position.

4. The image forming device as claimed in claim 1, wherein the rate/position controller comprises:
   a rate controller to calculate a rate control voltage for rate control;
   a position controller to calculate a position control voltage for position control; and
   a pulse width modulator (PWM) to output the control pulse by applying a pulse width modulation method to a sum of the rate control voltage and the position control voltage.

5. The image forming device as claimed in claim 4, wherein the rate/position controller further comprises:
   an adder to add the rate control voltage and the position control voltage.

6. The image forming device as claimed in claim 4, wherein the rate controller calculates the rate control voltage using the following equation:

$$\text{rate control voltage} = (V_{err} \times G_{P-V}) + \left(\left(\int V_{err}\right) \times G_{I-V}\right) + \left(\left(\frac{d}{dt} V_{err}\right) \times G_{D-V}\right)$$

where $V_{err}$ is the rate error, $G_{P-V}$ is a rate proportional gain preset in the rate controller, $G_{I-V}$ is a rate integral gain preset in the rate controller, and $G_{D-V}$ is a rate differential gain preset in the rate controller.

7. The image forming device as claimed in claim 4, wherein the position controller calculates the position control voltage using the following equation:

$$\text{position control voltage} = (P_{err} \times G_{P-P}) + \left(\left(\int P_{err}\right) \times G_{I-P}\right) + \left(\left(\frac{d}{dt} P_{err}\right) \times G_{D-P}\right)$$

where $P_{err}$ is the position error, $G_{P-P}$ is a position proportional gain preset in the position controller, $G_{I-P}$ is a position integral gain preset in the position controller, and $G_{D-P}$ is a position differential gain preset in the position controller.

8. The image forming device as claimed in claim 4, wherein:
   the rate controller calculates the rate control voltage for rate control by applying a control method to the rate error; and
   the position controller calculates the position control voltage for position control by applying the control method to the position error.

9. The image forming device as claimed in claim 8, wherein the control method is one of a Proportional Integral Derivative (PID) control method, a Proportional Integral (PI) control method, an Integral Derivative (ID) control method, a Proportional Derivative (PD) control method, a proportional control method, an integral control method, and a rate control method.

10. The image forming device as claimed in claim 1, wherein the unit is a scanning unit.

11. A method of controlling a scanning unit, the method comprising:
    calculating a rate error from a difference between a practical rotation rate and a target rotation rate of a motor that drives the scanning unit;
    determining a state of the motor using the practical rotation rate, the current position, and a time interrupt;
    calculating an optimal target rotation rate for the determined state of the motor and outputting the optimal target rotation rate for use in a calculating of rate;
    calculating a position error from a required target rate, the optimal target rotation rate, and a time interval of a time interrupt that is generated by a central processing unit (CPU) every control cycle;
    outputting a control pulse to control a rotation rate and a position of the motor by applying the rate error and the position error;
    outputting at least two pulses that vary according to the practical rotation rate of the motor;

measuring the practical rotation rate using a time interval and a physical distance interval of the at least two pulses; and measuring the current position by counting a number of edges whenever each of the edges is generated from the at least two pulses, wherein the calculating the target rotation operated at time intervals when the time interrupt is generated, so as to output a target rotation rate optimal to the determined state of the motor.

12. The method as claimed in claim 11, wherein the calculating of the position error comprises:

calculating a target position using a target rotation rate and a preset position error calculation cycle.

13. The method as claimed in claim 11, wherein the calculating of the position error comprises calculating the position error using the following equation:

$$P_{err} = (\int V_{cmd} \times T) - P_{mea}$$

where $P_{err}$ is the position error, $V_{cmd}$ is the target rotation rate, T is a position error calculation cycle, and $P_{mea}$ is the current position.

14. The method as claimed in claim 11, wherein the outputting of the control pulse comprises:

calculating a rate control voltage for rate control;

calculating a position control voltage for position control; and outputting the control pulse by applying a pulse width modulation method to a sum of the rate control voltage and the position control voltage.

15. The method as claimed in claim 14, wherein the calculating of the rate control voltage comprises calculating the rate control voltage using the following equation:

rate control voltage =

$$(V_{err} \times G_{P-V}) + \left(\left(\int V_{err}\right) \times G_{I-V}\right) + \left(\left(\frac{d}{dt} V_{err}\right) \times G_{D-V}\right)$$

where $V_{err}$ is the rate error, $G_{P-V}$ is a rate proportional gain preset in the rate controller, $G_{I-V}$ is a rate integral gain preset in the rate controller, and $G_{D-V}$ is a rate differential gain preset in the rate controller.

16. The method as claimed in claim 14, wherein the calculating of the position control voltage comprises calculating the position control voltage using the following equation:

position control voltage =

$$(P_{err} \times G_{P-P}) + \left(\left(\int P_{err}\right) \times G_{I-P}\right) + \left(\left(\frac{d}{dt} P_{err}\right) \times G_{D-P}\right)$$

where $P_{err}$ the position error, $G_{P-P}$ is a position proportional gain preset in the position controller, $G_{I-P}$ is a position integral gain preset in the position controller, and $G_{D-P}$ is a position differential gain preset in the position controller.

17. The method as claimed in claim 14, wherein:

the calculating of the rate control voltage comprises calculating the rate control voltage for rate control by applying a control method to the rate error; and the calculating of the position control voltage comprises calculating the position control voltage for position control by applying a control method to the position error.

18. The method as claimed in claim 11, wherein the control method is one of a Proportional Integral Derivative (PID) control method, a Proportional Integral (PI) control method, an Integral Derivative (ID) control method, a Proportional Derivative (PD) control method, a proportional control method, an integral control method, and a rate control method.

19. A device to control a motor, the device comprising:

a rate controller to calculate a rate control voltage for rate control based on a rate error calculated from a difference between a practical rotation rate and a target rotation rate of the motor;

a position controller to calculate a position control voltage for position control based on a position error calculated from required target rate and a time interval of a time interrupt that is generated by a central processing unit (CPU) every control cycle;

a pulse width modulator (PWM) to output a control pulse by applying a pulse width modulation method to a sum of the rate control voltage and the position control voltage;

a motor state controller to determine a state of the motor using the practical rotation rate, the current position, and the time interrupt;

a rate commander to output the target rotation rate that is optimal for the determined state of the motor;

a rate/position controller to output the control pulse to control a rotation rate and a position of the motor based on the optimal target rotation rate that is output by the rate commander;

an encoder to output at least two pulses that vary according to the practical rotation rate of the motor;

a practical rotation rate measurer to measure the practical rotation rate using a time interval and a physical distance interval of the at least two pulses; and a current position measurer to measure the current position by counting a number of edges whenever each of the edges is generated from the at least two pulses, wherein the motor state controller operates the rate commander at time intervals when the time interrupt is generated, so as to output a target rotation rate optimal to the determined state of the motor.

20. The device as claimed in claim 19, further comprising:

a rate error calculator to calculate the rate error from the difference between the practical rotation rate and the target rotation rate of the motor that drives the unit; and a position error calculator to calculate the position error from the difference between a current position and a target position of the motor.

21. The device as claimed in claim 20, wherein the position error calculator calculates the target position using the target rotation rate and a preset position error calculation cycle.

22. The device as claimed in claim 20, wherein the position error calculator calculates the position error using the following equation:

$$P_{err} = (\int V_{cmd} \times T) - P_{mea}$$

where where $P_{err}$ is the position error, $V_{cmd}$ is the target rotation rate, T is a position error calculation cycle, and $P_{mea}$ is the current position.

23. The device as claimed in claim 19, wherein the rate/position controller further comprises:

an adder to add the rate control voltage and the position control voltage.

24. The device as claimed in claim 19, wherein the rate controller calculates the rate control voltage using the following equation:

rate control voltage =

$$(V_{err} \times G_{P-V}) + \left(\left(\int V_{err}\right) \times G_{I-V}\right) + \left(\left(\frac{d}{dt} V_{err}\right) \times G_{D-V}\right)$$

where $V_{err}$ is the rate error, $G_{P-V}$ is a rate proportional gain preset in the rate controller, $G_{I-V}$ is a rate integral gain preset in the rate controller, and $G_{D-V}$ is a rate differential gain preset in the rate controller.

25. The device as claimed in claim 19, wherein the position controller calculates the position control voltage using the following equation:

position control voltage =

$$(P_{err} \times G_{P-P}) + \left(\left(\int P_{err}\right) \times G_{I-P}\right) + \left(\left(\frac{d}{dt} P_{err}\right) \times G_{D-P}\right)$$

where $P_{err}$ the position error, $G_{P-P}$ is a position proportional gain preset in the position controller, $G_{I-P}$ is a position integral gain preset in the position controller, and $G_{D-P}$ is a position differential gain preset in the position controller.

26. The device as claimed in claim 19, wherein:
the rate controller calculates the rate control voltage for rate control by applying a control method to the rate error; and
the position controller calculates the position control voltage for position control by applying the control method to the position error.

27. The device as claimed in claim 26, wherein the control method is one of a Proportional Integral Derivative (PID) control method, a Proportional Integral (PI) control method, an Integral Derivative (ID) control method, a Proportional Derivative (PD) control method, a proportional control method, an integral control method, and a rate control method.

28. The device as claimed in claim 19, wherein the motor drives a scanning unit of an image forming device.

29. An image forming device controlling a motor that drives a unit, the device comprising:
a rate/position controller to output a control signal to control a rotation rate and a position of the motor by applying a rate error and a position error of the motor, the position error calculated based on a required target rate, an optimal target rotation rate, and a time interval of a time interrupt that is generated by a central processing unit (CPU) every control cycle,
a motor state controller to determine a state of the motor using a practical rotation rate of the motor, a current position, and the time interrupt;
a rate commander to output the target rotation rate that is optimal for the determined state of the motor;
an encoder to output at least two pulses that vary according to a practical rotation rate of the motor;
a practical rotation rate measurer to measure the practical rotation rate using a time interval and a physical distance interval of the at least two pulses; and
a current position measurer to measure a current position by counting a number of edges whenever each of the edges is generated from the at least two pulses;
wherein the motor state controller operates the rate commander at time intervals when the time interrupt is generated, so as to output a target rotation rate optimal to the determined state of the motor.

30. The image forming device as claimed in claim 29, further comprising:
a rate error calculator to calculate the rate error from a difference between the practical rotation rate and the target rotation rate of the motor; and
a position error calculator to calculate the position error from a difference between the current position and a target position of the motor.

31. The image forming device as claimed in claim 29, wherein the position error calculator calculates the position error using the following equation:

$$P_{err} = (\int V_{cmd} \times T) - P_{mea}$$

where $P_{err}$ is the position error, $V_{cmd}$ is the target rotation rate, T is a position error calculation cycle, and $P_{mea}$ is the current position.

32. The image forming device as claimed in claim 29, wherein the rate/position controller comprises:
a rate controller to calculate a rate control voltage for rate control;
a position controller to calculate a position control voltage for position control; and
a pulse width modulator (PWM) to output the control signal by applying a pulse width modulation method to a sum of the rate control voltage and the position control voltage.

33. The image forming device as claimed in claim 32, wherein the rate/position controller further comprises:
an adder to add the rate control voltage and the position control voltage.

* * * * *

UNITED STATES PATENT AND TRADEMARK OFFICE
CERTIFICATE OF CORRECTION

PATENT NO. : 8,773,726 B2
APPLICATION NO. : 11/696925
DATED : July 8, 2014
INVENTOR(S) : Hyoung-il Kim Page 1 of 1

It is certified that error appears in the above-identified patent and that said Letters Patent is hereby corrected as shown below:

In the Claims,

Column 10, Line 3, In Claim 6, delete "eauation:" and insert -- equation: --, therefor.

Column 11, Line 56, In Claim 16, delete "$P_{err}$." and insert -- $P_{err}$ is --, therefor.

Column 12, Line 58 (Approx.), In Claim 22, delete "where where" and insert -- where --, therefor.

Column 13, Line 21, In Claim 25, delete "$P_{err}$." and insert -- $P_{err}$ is --, therefor.

Column 14, Line 33 (Approx.), In Claim 31, delete "the target" and insert -- a target --, therefor.

Column 14, Line 35 (Approx.), In Claim 31, delete "the current" and insert -- a current --, therefor.

Signed and Sealed this
Third Day of February, 2015

Michelle K. Lee
*Deputy Director of the United States Patent and Trademark Office*